United States Patent [19]

Kuhl

[11] Patent Number: 4,537,208

[45] Date of Patent: Aug. 27, 1985

[54] HORIZONTAL FLAT DESTACKER

[76] Inventor: Henry Y. Kuhl, Kuhl Rd., P.O. Box 26, Flemington, N.J. 08822

[21] Appl. No.: 517,122

[22] Filed: Jul. 25, 1983

[51] Int. Cl.³ .............................................. B08B 3/00
[52] U.S. Cl. ...................................... 134/124; 271/5; 271/6; 271/150; 271/207; 271/31.1
[58] Field of Search ....................... 271/3, 4, 5, 6, 149, 271/150, 207, 30 A; 134/57 R, 124

[56] References Cited

U.S. PATENT DOCUMENTS

| | | | |
|---|---|---|---|
| 2,896,946 | 7/1959 | Barratt | 271/6 |
| 2,915,308 | 12/1959 | Matzen | 271/5 |
| 3,053,529 | 9/1962 | Dunn | 271/11 |
| 3,130,967 | 4/1964 | Le Brell | |
| 3,176,978 | 4/1965 | Baker | 271/5 |
| 3,541,597 | 11/1970 | Segawa | |
| 3,718,217 | 2/1973 | Stobb | |
| 3,724,640 | 4/1973 | Rapparlie | |
| 3,774,783 | 11/1973 | Miller | |
| 3,912,253 | 10/1975 | Jarman | 271/5 |
| 3,945,633 | 3/1976 | Knopp | 271/3.1 |
| 4,168,772 | 9/1979 | Eberle | 271/30 A |
| 4,177,982 | 12/1979 | Bewersdorf | 271/6 |
| 4,262,896 | 4/1981 | Uchida | 271/90 |

Primary Examiner—Richard A. Schacher
Attorney, Agent, or Firm—Sperry, Zoda & Kane

[57] ABSTRACT

A device is disclosed for destacking individual flats from a horizontally extending stack thereof for processing as well as a device for restacking of the processed flats. Biasing devices are disclosed for maintaining the integrity of the horizontally extending stacks of flats prior to processing such as washing and subsequent to such processing. A vacuum pick-up device is movable from the supply stack to a conveyor traveling through the processing station. A flat removal device which is cam operated is cyclically movable from a removal position to a restacking position and vice versa. Resilient retaining members such as spring biased doors and flexible plastic and steel members are included for retaining the uppermost flats of the horizontally extending supply stack and the lowermost flats of the horizontally extending restacked flats.

9 Claims, 4 Drawing Figures

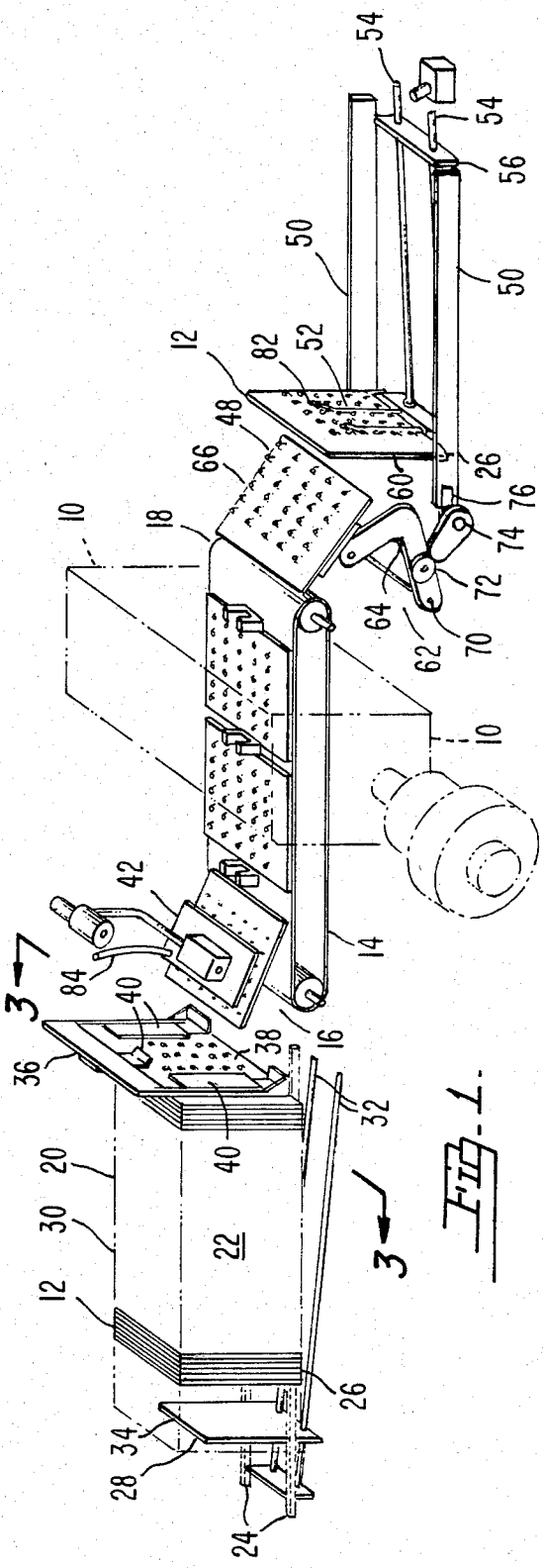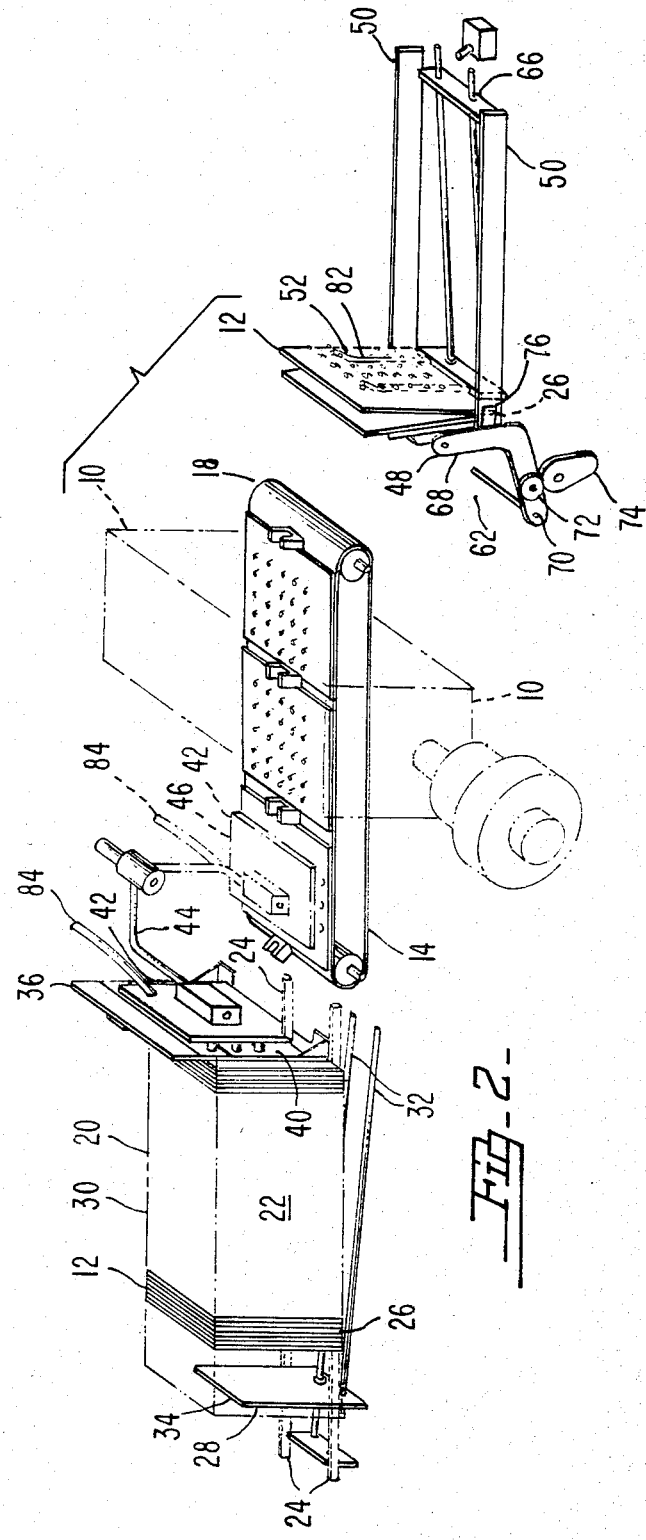

HORIZONTAL FLAT DESTACKER

BACKGROUND OF THE INVENTION

1. Field of the Invention

The present invention deals with the general problem of the removal of article carrying flats individually from a stack of interfitted stacks. By the natural configuration of such article carrying flats they tend to interconnect with one another and thereby form an integral stack. Normally a stack is oriented in the vertically extending position and the uppermost flat is removed. Such devices require extensive members and movements and as such the present invention as designed is deemed to overcome the inherent problems with such configurations.

The present invention is also particularly usable since it will work with all types of article carrying flats including plastic egg trays or filler flats. Some such flats have holes and some such flats do not have holes and the present invention is particularly usable since it can accommodate both designs. Also the present design is usable with such flats of cardboard or molded materials or any other type of design due to the usage of a vacuum pick-up head or transfer arm which is universally usable.

2. Description of the Prior Art

Numerous prior art devices have been patented for feeding machines as shown by U.S. Pat. No. 2,896,946 to H. Barratt et al for a Sheet Feeding Apparatus; U.S. Pat. No. 2,915,308 issued to J. C. Matzen for Automatic Feeding Machines; U.S. Pat. No. 3,053,529 issued to M. B. Dunn for a Blank Feeding Apparatus For Box Erecting Machine; U.S. Pat. No. 3,130,967 to J. Le Brell for Hopper Feed For Carton Blanks; U.S. Pat. No. 3,176,978 to T. R. Baker et al for Blank Feeders For Box Forming Machines; U.S. Pat. No. 3,541,597 to Toyoo Segawa et al for a Plate Stacking Apparatus; U.S. Pat. No. 3,718,217 to A. R. Stobb et al on an Apparatus For Feeding Signatures; U.S. Pat. No. 3,724,640 to Hans Rapparlie on a Device For Forming Stacks From A Flow Of Consecutively Furnished Flat Items; U.S. Pat. No. 3,774,783 to A. H. Miller et al for an Apparatus For Handling Sheet Material; U.S. Pat. No. 3,912,253 to David J. Jarman on an Entry And Exit Stacking System; U.S. Pat. No. 3,945,633 to Arthur A. Knopp on a Hopper Loader; and U.S. Pat. No. 4,262,896 to Isamu Uchida et al on a Suction Head In A Paper Sheet Counting Machine.

These patented designs each have various difficulties which are overcome by the present design due to the usage of the pick-up head and the removal arm of the present invention. These movements greatly facilitate packing of horizontally extending stacks of flats.

SUMMARY OF THE INVENTION

The present invention provides a horizontal flat destacker including a processing station for performing an operation such as washing upon article carrying flats singly. This processing station can include a processing conveyor means for moving single flats therethrough. The processing station includes an inlet area adjacent to a supply stack of flats and an exit area adjacent to a restacked set of flats.

A horizontal flat supply means is included in the present invention adjacent to the inlet area of the processing station and is adapted to supply a stack of flats oriented extending horizontally to the processing station. The horizontal flat supply means includes a supply conveyor means traveling at a very slow rate of speed toward the processing station and adapted to receive the horizontally extending stack of flats with the edges thereof resting upon the supply conveyor means. In this manner the supply conveyor means facilitates movement of same toward the processing station by the very slow movement thereof and abutment with the lower edges of the flats.

To further facilitate this movement a supply biasing means is positioned in abutment with the bottommost flat of the horizontal stack to urge the stack toward the processing station. This supply biasing means includes a supply bar means extending longitudinally with respect to the supply conveyor and a supply biasing member in abutment with the bottommost flat of the horizontally extending stack. The supply biasing member is movably mounted upon the supply bar means in such a manner as to allow completely free longitudinal movement thereof with respect to the bar means. With the supply bar means being inclined downwardly toward the processing station the supply biasing means is caused to urge the horizontal stack of flats toward the processing station due to the gravitational force urging the supply biasing means to move downwardly on the supply bar means.

A flat transfer means for moving a single uppermost flat of the horizontally extending stack onto the processing conveyor means is further included. Preferably this flat transfer means includes a supply retaining means for resiliently retaining the uppermost flat of the horizontal stack upon the horizontal flat supply means. The flat transfer means also includes a transfer arm which is movable between a pick-up position adjacent to the horizontally extending stack of flats on the horizontal flat supply means and a placement position adjacent to the inlet area of the processing conveyor means. This transfer arm is adapted to releasably grip and abut the uppermost flat in the pick-up position and overcome the supply retaining means to move the uppermost flat to the inlet area of the conveyor means by release thereof when in the placement position.

The horizontal flat destacker of the present invention further includes a horizontal flat restacking means positioned adjacent to the exit area of the processing station and is adapted to receive flats therefrom for restacking in a horizontal orientation. This horizontal flat restacking means may include stack support rails for abutting the lower edge of each flat of the horizontally extending stack for support thereof. The horizontal flat restacking means further includes a restacking biasing means including a restacking bar means extending longitudinally along the stack support rails as well as a restacking biasing member which may include two vertically extending rods mounted upon the restacking bar means with freedom of longitudinal movement therealong. The restacking biasing member is adapted to abut the uppermost flat of the horizontal stack thereof positioned on the horizontal flat restacking means. This restacking bar means is inclined downwardly toward the processing station to cause the restacking biasing means to urge the horizontally extending stack of flats toward the processing station.

A flat removal means is also included positioned between the exit area of the processing station and the horizontal flat restacking means in such a fashion as to be capable of moving individual flats from the processing conveyor means to the bottom of the horizontal stack positioned on the stack support rails. This flat removal means may include a removal arm pivotally mounted with respect to the processing station and the flat restacking means and is movable from a removal position adjacent to the exit area of the processing station to a restacking position adjacent to the lowermost flat of the horizontal stack located thereon. The removal arm when in the removal position is adapted to remove a single flat exiting the processing station for being carried to the horizontal flat restacking means for placement onto the bottom of the stack of flats thereof. A cam follower means is secured with respect to the removal arm and is mated with a camming means rotatably mounted with respect to the flat removal means which is adapted to abut this cam follower means in such a manner as to cause movement of the removal arm and to control movement thereof from a removal position to the restacking position and back.

It is an object of the present invention to provide a horizontal flat destacker usable for the individual removal of flats and the replacement of individual flats with respect to horizontally extending stacks of flats.

It is an object of the present invention to provide a horizontal flat destacker which is usable with any type of processing station and it is particularly usable with a wash station.

It is an object of the present invention to provide a horizontal flat destacker which minimizes expenses.

It is an object of the present invention to provide a horizontal flat destacker which also restacks in a horizontally extending direction.

It is an object of the present invention to provide a horizontal flat destacker usable with many types of article carrying flats such as plastic egg trays or filler flats with or without holes as well as cardboard or molded filler flats.

It is an object of the present invention to provide a horizontal flat destacker which minimizes maintenance requirements.

It is an object of the present invention to provide a horizontal flat destacker which includes a minimum number of moving parts.

It is an object of the present invention to provide a horizontal flat destacker which maintains close spacing between individual flats while located within a horizontally extending stack.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side perspective view of an embodiment of a horizontal flat destacker of the present invention showing the transfer arm in an intermediate position and the removal arm in the removal position;

FIG. 2 is an illustration of the embodiment shown in FIG. 1 with the transfer arm shown in the pick-up position in full outline and in the placement position in dotted outline and with the removal arm shown in the restacking position;

DETAILED DESCRIPTION OF THE PREFERRED EMBODIMENT

Figure 3:
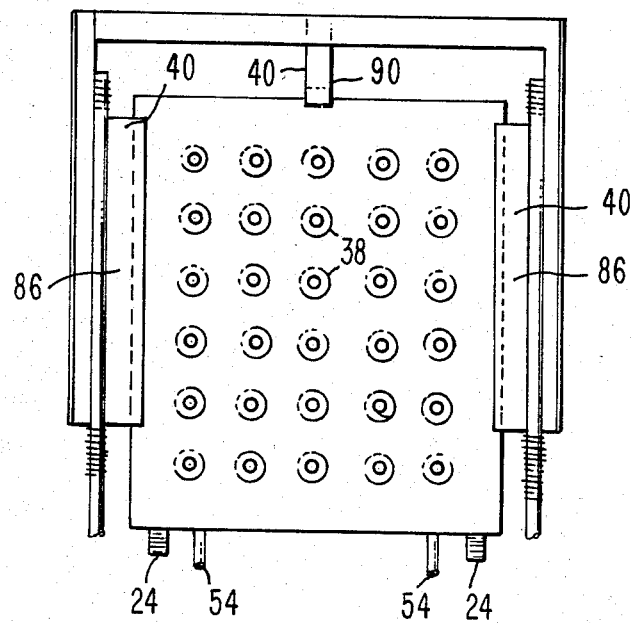
FIG. 3 is a cross section of the embodiment shown in FIG. 2 through lines 3—3.
Figure 4:
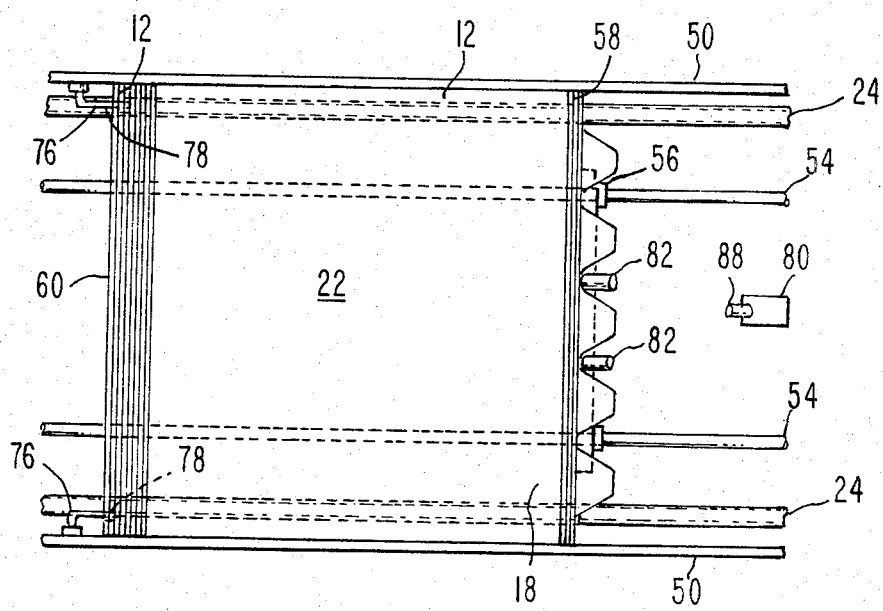
FIG. 4 is a top plan view of an embodiment of the horizontal flat restacking means of the present invention.

The present invention provides a novel horizontal flat destacker means usable with a washer or other processing station 10 for article carrying flats 12. The processing station 10 will preferably include a processing conveyor means 14 which defines an inlet area 16 for receiving article carrying flats 12 and an exit area 18 where these flats 12 are to be removed.

The inlet area 16 is preferably positioned adjacent to a horizontal flat supply means 20 adapted to retain a horizontally extending stack 22 of flats 12 thereon. This supply means 20 may include a supply conveyor means 24 moving at a very slow rate of speed as desired necessary to supply the horizontally extending stack of flats to the processing conveyor means 14 one at a time.

The edges 26 of the flats 12 are positioned in abutment with the upper surface of the supply conveyor means 24 in such a fashion as to facilitate movement thereof by movement of the conveyor means.

To maintain the individual flats 12 of the horizontal stack 22 in abutment with one another a supply biasing means 28 may be included. This biasing means basically exerts force against the bottommost flat 30 due to a combination of action between a supply bar means 32 and a supply biasing member 34. The bar means 32 is inclined slightly downwardly toward the processing station 10 and the supply biasing member is mounted upon the supply bar means with complete freedom of longitudinal movement therealong. Since the supply bar means 32 is inclined slightly downwardly the supply biasing member 34 will be urged against the bottommost flat 30 thereby maintaining the integrity of the horizontally extending flat in the supply means.

To facilitate movement of the uppermost flat 38 of the horizontally extending flat to the processing station a flat transfer means 36 is preferably included between the supply means 20 and the processing station 10. This flat transfer means 36 may include a supply retaining means 40 for holding the uppermost flat 38 in position awaiting removal by the flat transfer means 36. That portion of the flat transfer 36 which is responsible for this direct movement is the transfer arm 40 which is adapted to move adjacent to the uppermost flat 38 in a pick-up position 44 and by vacuum suction or other operation grip the flat 38 preparatory to movement. The transfer arm 42 will then move to a placement position 46 adjacent to the upper surface of the processing conveyor means 14 where the vacuum or other gripping means will be released causing placement of the flat 38 upon the processing conveyor means 14.

After processing such as washing has been completed the processing conveyor means 14 will carry the flat 12 to the exit area 18 thereof. Adjacent to this exit area is located the horizontal flat restacking means 48.

This restacking means includes stack support rails 50 as well as a restacking biasing means for maintaining integrity of the horizontally extending stack. Restacking biasing means 52 may be of a number of different types of forms but in this embodiment it is shown as having a restacking bar means 54 extending slightly inclined downwardly toward the processing station 10 and with a restacking biasing member 56 movably mounted upon this bar means such that gravitational force acting upon the restacking biasing member 56 will cause force to be exerted against the uppermost flat 58 of the restacked horizontally extending stack of flats causing compression of this horizontally extending stack for proper restacking. The bottommost flat 60 is where each new flat is placed by the flat removal means 62.

Flat removal means 62 includes a removal arm 64 movable from a removal position 66 adjacent to the processing conveyor means 14 to a restacking position 68 adjacent to the horizontal flat restacking means 48. Removal arm 64 is pivotally mounted upon pivot means 70 to facilitate this movement. The movement is actually caused by a cam follower means 72 fixedly secured to the removal arm 64 and positioned such as to be in abutment with a rotating camming means 74 having an eccentric lobe thereon which controls movement of the removal arm 64 from the removal position 66 to the restacking position 68 and back.

With the restacking biasing means 52 exerting pressure downwardly on the top of the horizontally extending stack a resilient holding means 76 is necessary to hold the bottom few flats of this horizontally extending stack to facilitate a slight compression of the stack. These resilient holding means may take the form of flexible plastic members 78 adapted to be maintained in a flexed position in such as manner as to exert a slightly inwardly directed pressure for holding the bottom portion of the horizontally extending stack.

In order to show indication of when the capacity of the horizontal flat restacking means 48 has been reached a limit switch means 80 may be positioned such that contacts 88 thereof are closed when the restacking biasing means is pushed longitudinally along the restacking bar means 54 to a sufficient extent. Also preferably the restacking biasing member may take the form of two vertically extending rods 82 to be usable thereby with a variety of different flat designs. Also the vacuum means 84 is the preferable means for detachably securing of individual flats with respect to the transfer arm 42. Also the resiliently biased pivotally movable door members 86 are the preferable means for holding of the uppermost flat 38 of the supply flat stack preparatory to being gripped and removed by the movement of the transfer arm 42 to the pick-up position 44.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A horizontal flat destacker comprising:
(a) a processing station for performing an operation upon article carrying flats singly, said processing station including a processing conveyor means for moving single flats through said processing station, said processing station including an inlet area and an exit area with said processing conveyor means adapted to move flats from said inlet area thereof to said exit area thereof;
(b) a horizontal flat supply means adapted to supply a stack of flats oriented extending horizontally to said inlet area of said processing station, said horizontal flat supply means comprising:
  (1) a supply conveyor means traveling toward said processing station and adapted to receive a horizontally extending stack of flats with the edges of the flats resting upon said supply conveyor means to facilitate conveying same toward said processing station;
  (2) a supply biasing means positioned in abutment with the bottommost flat of a horizontally extending stack of flats to urge the stack toward said processing station, said supply biasing means including a supply bar means extending longitudinally with respect to said supply conveyor means and a supply biasing member in abutment with the bottommost flat of the horizontally extending stack and movably mounted upon said supply bar means to allow free longitudinal movement thereof with respect to said bar means, said supply bar means being inclined downwardly toward said processing station to cause said supply biasing member to urge the horizontal stack of flats toward said processing station by gravitational force urging said supply biasing member to move downwardly on said supply bar means;
(c) a flat transfer means for moving onto the processing conveyor means a single uppermost flat of the horizontally extending stack thereof located upon said horizontal flat supply means, said flat transfer means comprising:
  (1) a supply retaining means for resiliently retaining the uppermost flat of a horizontal stack upon said horizontal flat supply means;
  (2) a transfer arm movable between a pick-up position adjacent to the horizontally extending stack of flats on said horizontal flat supply means and a placement position adjacent said inlet area of said processing conveyor means, said transfer arm adapted to abut and releasably grip the uppermost flat in the pick-up position and overcome said supply retaining means to move the uppermost flat to said inlet area of said processing conveyor means by release therof when in said placement position;
(d) a horizontal flat restacking means adjacent to said exit area and adapted to receive flats from said processing station for restacking in a horizontal orientation, said horizontal flat restacking means including stack support rails for abutting the lower edge of each flat of the horizontally extending stack for support thereof, said horizontal flat restacking means also including a restacking biasing means comprising a restacking bar means extending longitudinally along said stack support rails and a restacking biasing member mounted upon said restacking bar means with freedom of longitudinal movement therealong, said restacking biasing member adapted to abut the uppermost flat of the horizontal stack thereof positioned on said horizontal flat restacking means, said restacking bar means being inclined downwardly toward said processing station to cause said restacking biasing means to urge the horizontally extending stack of flats toward said processing station;
(e) a flat removal means positioned between said exit area of said processing station and said horizontal flat restacking means to move individual flats from said processing conveyor means to the bottom of the horizontal stack positioned on said stack support rails, said flat removal means including:
  (1) a removal arm pivotally mounted with respect to said processing station and said horizontal flat restacking means and movable from a removal position adjacent to said exit area of said processing station to a restacking position adjacent to the lowermost flat of the horizontal stack located thereon, said removal arm when in the removal position adapted to remove a single flat exiting the processing station for being carried to said horizontal flat restacking means for placement onto the bottom of the stack of flats thereon;

(2) a cam follower means secured with respect to said removal arm; and (3) a camming means rotatably mounted with respect to said flat removal means and adapted to abut said cam follower means to cause and control movement of said removal arm from the removal position to the restacking position and vice versa.

2. The horizontal flat destacker as defined in claim 1 wherein said horizontal flat restacking means includes a resilient holding means secured with respect to said stack support rails and adapted to resiliently bias and hold the edges of the lowermost flats positioned on said horizontal flat restacking means.

3. The horizontal flat destacker as defined in claim 2 wherein said resilient holding means comprises flexible plastic members.

4. The horizontal flat destacker as defined in claim 1 wherein said horizontal flat restacking means includes a limit switch means operable to be activated responsive to the maximum flat capacity of said horizontal flat restacking means.

5. A horizontal flat destacker as defined in claim 1 wherein said restacking biasing member comprises two vertically extending rods.

6. The horizontal flat destacker as defined in claim 1 wherein said transfer arm includes a vacuum means to facilitate gripping of flats for transfer to said processing conveyor means.

7. The horizontal flat destacker as defined in claim 1 wherein said processing station is a washing station.

8. The horizontal flat destacker as defined in claim 1 wherein said supply retaining means includes resiliently biased pivotally movable door members adapted to be urged to open responsive to movement of said transfer arm from the pick-up position to the placement position.

9. A horizontal flat destacker comprising:

(a) a processing station for washing article carrying flats singly, said processing station including a processing conveyor means for moving single flats through said processing station, said processing station including an inlet area and an exit area with said processing conveyor means adapted to move flats from said inlet area thereof to said exit area thereof;

(b) a horizontal flat supply means adapted to supply a stack of flats oriented extending horizontally to said inlet area of said processing station, said horizontal flat supply means comprising:

(1) a supply conveyor means traveling toward said processing station and adapted to receive a horizontally extending stack of flats with the edges of the flats resting upon said supply conveyor means to facilitate conveying same toward said processing station;

(2) a supply biasing means positioned in abutment with the bottommost flat of a horizontally extending stack of flats to urge the stack toward said processing station, said supply biasing means including a supply bar means extending longitudinally with respect to said supply conveyor means and a supply biasing member in abutment with the bottommost flat of the horizontally extending stack and movably mounted upon said supply bar means to allow free longitudinal movement thereof with respect to said bar means, said supply bar means being inclined downwardly toward said processing station to cause said supply biasing member to urge the horizontal stack of flats toward said processing station by gravitational force urging said supply biasing member to move downwardly on said supply bar means;

(c) a flat transfer means for moving onto the processing conveyor means a single uppermost flat of the horizontally extending stack thereof located upon said horizontal flat supply means, said flat transfer means comprising:

(1) a supply retaining means for resiliently retaining the uppermost flat of a horizontal stack upon said horizontal flat supply means, said supply retaining means including resiliently biased pivotally movable door member;

(2) a transfer arm movable between a pick-up position adjacent to the horizontally extending stack of flats on said horizontal flat supply means and a placement position adjacent said inlet area of said processing conveyor means, said transfer arm adapted to abut and releasably vacuum grip the uppermost flat in the pick-up position and overcome said supply retaining means by opening of said resiliently biased pivotally movable door members to move the uppermost flat to said inlet area of said processing conveyor means by release thereof when in said placement position;

(d) a horizontal flat restacking means adjacent to said exit area and adapted to receive flats from said processing station for restacking in a horizontal orientation, said horizontal flat restacking means including stack support rails for abutting the lower edge of each flat of the horizontally extending stack for support thereof, said horizontal flat restacking means also including a restacking biasing means comprising a restacking bar means extending longitudinally along said stack support rails and a restacking biasing member comprising two vertically extending rods mounted upon said restacking bar means with freedom of longitudinal movement therealong, said restacking biasing member adapted to abut the uppermost flat of the horizontal stack thereof positioned on said horizontal flat restacking means, said restacking bar means being inclined downwardly toward said processing station to cause said restacking biasing means to urge the horizontally extending stack of flats toward said processing station, said horizontal flat restacking means including a resilient holding means secured with respect to said stack support rails and adapted to resiliently bias and hold the edges of the lowermost flats positioned on said horizontal flat restacking means, said resilient holding means comprising flexible plastic members, said horizontal flat restacking means further including a limit switch means operable to be activated responsive to the maximum flat capacity of said horizontal flat restacking means;

(e) a flat removal means positioned between said exit area of said processing station and said horizontal flat restacking means to move individual flats from said processing conveyor means to the bottom of the horizontal stack positioned on said stack support rails, said flat removal means including:

(1) a removal arm pivotally mounted with respect to said processing station and said horizontal flat restacking means and movable from a removal position adjacent to said exit area of said processing station to a restacking position adjacent to the lowermost flat of the horizontal stack located thereon, said removal arm when in the removal position adapted to remove a single flat exiting the processing station for being carried to said horizontal flat restacking means for placement onto the bottom of the stack of flats thereon;

(2) a cam follower means secured with respect to said removal arm; and (3) a camming means rotatably mounted with respect to said flat removal means and adapted to abut said cam follower means to cause and control movement of said removal arm from the removal position to the restacking position and vice versa.

* * * * *